United States Patent
Fisher et al.

[11] Patent Number: 6,106,941
[45] Date of Patent: Aug. 22, 2000

[54] ADHESIVE SYSTEM

[75] Inventors: Dennis K. Fisher; James F. Wood; Stephen J. Eder, all of Jackson County, Mich.

[73] Assignee: Adco Products, Inc., Michigan Center, Mich.

[21] Appl. No.: 09/123,914

[22] Filed: Jul. 29, 1998

[51] Int. Cl.$^7$ .................. C09J 7/02; B32B 7/12; B09J 7/00

[52] U.S. Cl. .................. 428/355 EN; 428/353; 428/355 AC; 428/355 BL; 428/356; 427/208; 427/208.4

[58] Field of Search .................. 428/353, 354, 428/355 AC, 355 BL, 355 EN, 356; 427/208, 208.4

[56] References Cited

U.S. PATENT DOCUMENTS

| | | | |
|---|---|---|---|
| Re. 24,906 | 12/1960 | Ulrich | 206/59 |
| 4,514,442 | 4/1985 | Crepeau | 427/140 |
| 4,666,785 | 5/1987 | Crepeau | 428/521 |
| 4,767,653 | 8/1988 | Renstrom | 428/40 |
| 4,810,565 | 3/1989 | Wasitis et al. | 428/215 |
| 4,839,206 | 6/1989 | Waldenberger | 427/208 X |
| 4,849,268 | 7/1989 | Backenstow et al. | 428/57 |
| 4,849,468 | 7/1989 | Murachi et al. | |
| 5,023,138 | 6/1991 | McIntyre | 428/352 |
| 5,024,886 | 6/1991 | Geisen et al. | 428/332 |
| 5,093,206 | 3/1992 | Schoenbeck | 428/521 |
| 5,116,676 | 5/1992 | Winslow | 428/343 |
| 5,143,972 | 9/1992 | Groves | 525/71 |
| 5,180,635 | 1/1993 | Plamthottam et al. | 427/208 X |
| 5,229,206 | 7/1993 | Groves | 428/344 |
| 5,234,987 | 8/1993 | Hubbard et al. | 524/505 |
| 5,242,727 | 9/1993 | Briddell et al. | 428/42 |
| 5,264,281 | 11/1993 | Arakawa et al. | 427/208 X |
| 5,354,600 | 10/1994 | Fisher et al. | 428/215 |
| 5,589,122 | 12/1996 | Leonard et al. | 264/146 |
| 5,599,602 | 2/1997 | Leonard et al. | 428/56 |

FOREIGN PATENT DOCUMENTS 0 384 598   8/1990   European Pat. Off. .
5-287245   11/1993   Japan .

*Primary Examiner*—Daniel Zirker
*Attorney, Agent, or Firm*—Killworth, Gottman, Hagan & Schaeff, L.L.P.

[57] ABSTRACT

A multi-component adhesive system for adhering polar surfaces to non-polar surfaces comprising: (a) a non-polar adhesive layer for bonding to a non-polar surface; and (b) polar adhesive layer bonded to said non-polar adhesive layer for bonding to a polar surface.

17 Claims, 2 Drawing Sheets

ADHESIVE SYSTEM

FIELD OF INVENTION

The present invention relates generally to bonding a polar surface to a non-polar surface. More specifically, this invention relates to a multi-component adhesive system having one component that adheres to a polar surface and another component that adheres to a non-polar surface.

BACKGROUND OF THE INVENTION

Adhering polar (charged) surfaces to non-polar (neutral) surfaces tends to be problematic, often involving expensive and specialized equipment and inconvenient application techniques. For example, in the automotive industry, it is necessary to bond EPDM-based weatherstripping (non-polar) to an automobile's painted surfaces (polar). This has been performed traditionally using a heat-activated dual-sided tape. To apply this tape, however, the weatherstripping manufacturers must employ heat laminating machinery which uses torches to blast hot air at the nip point between the heat activated adhesive and the EPDM-based weatherstripping. Such heat-activated adhesive not only involves specialized and expensive equipment, but also tends to be inconvenient and, at times, dangerous.

Rather than heat-activated adhesives, it is highly preferable from a convenience and expense standpoint to use pressure-sensitive adhesives. Such adhesives, however, tend to be inadequate in bonding polar surfaces to non-polar surfaces. The difficulty arises because pressure-sensitive adhesives are specific to polar and non-polar applications. That is, they tend to bond strongly with only their respective surfaces. Any bonding between non-polar adhesives and polar surfaces and polar adhesives and non-polar surfaces is usually a consequence of the adhesive's tack rather than chemical bonding. Therefore, there is a need to combine the bonding properties of polar and non-polar adhesives to adequately adhere a polar surface to a non-polar surface.

One approach to bonding polar and non-polar surfaces is to use a blend of non-polar and polar adhesives. Unfortunately, members from one class of adhesives are generally not miscible with, and do not adhere to, members of the other class. More specifically, the interfacial regions between the domains of each component are weak and result in adhesive splitting when subjected to stress. As used herein, the term "adhesive splitting" refers generally to the physical separation of one adhesive component from another adhesive component. In addition to being susceptible to adhesive splitting, a blend necessarily dilutes the concentration of a particular adhesive in the blend. Reducing an adhesive's concentration reduces its adhesive strength. For this reason, it is preferable to have distinct, or "dedicated," layers of concentrated adhesive for bonding to their respective polar or non-polar surfaces. However, the surface area available for interfacial bonding between polar/non-polar adhesive layers is far less than that available in a mixture of polar/non-polar components, thereby exacerbating problems of adhesive splitting.

A need therefore exists for a pressure-sensitive adhesive system that bonds polar surfaces to non-polar surfaces with the strength exhibited by distinct layers of polar/non-polar adhesives. The present invention fulfills this need among others.

BRIEF DESCRIPTION OF THE DRAWINGS

The invention will be further explained with reference to the drawings, wherein.

DESCRIPTION OF THE INVENTION AND PREFERRED EMBODIMENTS

Figure 1:
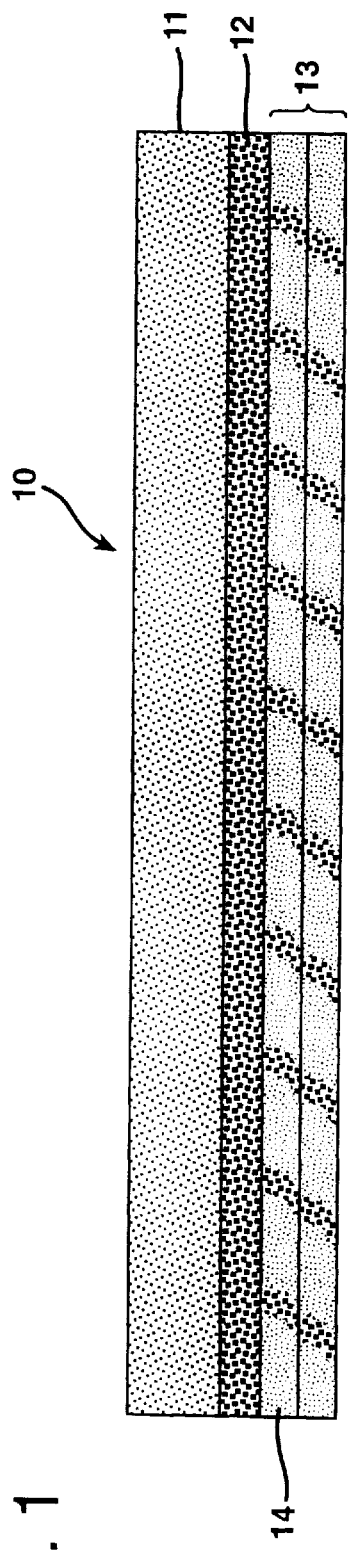
FIG. 1 shows a cross-section of a portion of one embodiment of a tape of the invention.

The present invention provides for a pressure-sensitive, double-sided tape which has commercially-available or readily-synthesized polar and non-polar adhesive layers on opposite sides thereof for adhering to polar and non-polar surfaces, respectively. Being pressure-sensitive, the tape can be applied to polar/non-polar surfaces through simple pressure adhesion rather than through heating or other inconvenient application techniques. Moreover, since the tape has distinct layers of polar/non-polar adhesive, its adhesive strength is not compromised by dilution inherent in blends. Therefore, the tape bonds polar and non-polar surfaces with strength and convenience unmatched by prior art adhesive systems.

Traditionally, the use of such a tape has been avoided due to the poor bonding strength between the adhesive layers as mentioned in the background section. It has been found, however, that strong bonding between adhesive layers can be achieved by priming the interface of the adhesive layers with a low-viscosity, non-polar adhesive solution. The non-polar adhesive solution or primer permeates the surface of the polar adhesive layer and gains a "foothold" therein. When dried, the primer is mechanically anchored in the polar adhesive layer and capable of chemically bonding to a non-polar adhesive layer. The interfacial bonding achieved between the adhesive layers approaches, and often even exceeds, the adhesive strength of either layer.

One aspect of the invention is a multi-component adhesive system for adhering polar surfaces to non-polar surfaces. In a preferred embodiment, the system is a tape comprising: (a) a non-polar adhesive layer for bonding to a non-polar surface; and (b) a polar adhesive layer bonded to said non-polar adhesive layer for bonding to a polar surface.

Another aspect of the invention is a method for producing a multi-component adhesive system for adhering polar surfaces to non-polar surfaces. In a preferred embodiment, the method comprises: (a) providing a polar adhesive layer and a non-polar adhesive layer; (b) priming at least one of either the polar adhesive layer, the non-polar adhesive layer, or both the polar and non-polar adhesive layers; and (c) interfacing the polar adhesive layer with the non-polar adhesive layer.

Yet another aspect of the invention is a method for joining polar surfaces to non-polar surfaces using the multi-component adhesive system described above. In a preferred embodiment, the method comprises applying either the polar or non-polar adhesive layer to a polar or non-polar surface, respectively. Optionally, the method further comprises applying the remaining non-applied adhesive layer to its respective surface.

A further aspect of the invention is a modified article suitable for adhesion to either a polar or non-polar surface. In a preferred embodiment, the modified article comprises (a) an article; and (b) a double-sided tape comprising (i) a non-polar adhesive layer; and (ii) a polar adhesive layer bonded to said non-polar adhesive layer; wherein either the polar or non-polar layer is adhered to the article leaving the non-adhered layer available for bonding to its respective surface.

A preferred embodiment of the double-sided tape of the present invention is shown in FIG. 1. As shown, a polar adhesive layer 13 is overlaid with a primer layer 12 which infiltrates the polar adhesive layer 13. Primer layer 12 in turn is overlaid with a non-polar adhesive layer 11.

The aforementioned aspects of the present invention relate to the strong bonding between the non-polar and polar adhesive layers 13, 11. Since a multilayer tape will always be limited by the bonding strength between its layers, it is imperative that the interfacial bonding strength of the layers at least meet the adhesive requirements of the tape. Therefore, unless otherwise indicated, the adhesive strength parameters of the tape apply not only to the adhesive bonds, but also to the bond between the adhesive layers.

Accordingly, it is preferred that tape have a peel strength (as defined by GM 9797P test method, incorporated herein by reference) of at least 4 pounds per linear inch (pli), more preferably of at least about 7 pli, and even more preferably of at least about 8 pli after aging for 24 hours at room temperature. Additionally, it is preferred that tape have a creep strength (as defined by GM 9758P test method, incorporated herein by reference) of at least 0.21 $lb/in^2$, more preferably of at least about 0.5 $lb/in^2$, and even more preferably of at least about 0.71 $lb/in^2$.

The primer of the present invention is a non-polar adhesive solution comprising an adhesive composition and an organic solvent. As mentioned above, the primer is allowed to permeate the surface of the polar adhesive to gain a mechanical foothold therein. The organic solvent of the primer then evaporates leaving a dried primer layer 12 comprising a coating of the non-polar adhesive composition.

To facilitate surface permeation, it is important that the primer have a relatively low viscosity. Preferably, the viscosity should be no greater than about 3000 cps at 23° C., more preferably no greater than about 2000 cps at 23° C., and even more preferably no greater than about 1700 cps at 23° C.

To achieve such viscosities, substantial dilution of the non-polar adhesive composition is generally required. The primer's concentration of adhesive composition should be high enough, however, such that, after the solvent evaporates, a sufficient residue remains to provide adequate bonding. Accordingly, it has been found that an adhesive composition concentration in the primer of about 3 to about 25 wt. % is preferred, about 5 to about 20 wt. % is more preferred, and about 8 to about 15 wt. % is even more preferred.

The adhesive composition preferably comprises a majority portion of an elastomeric polyolefin, and, optionally, one or more of the following: tackifier, cure package, colorants, fillers, UV stabilizers, and other known additives.

Suitable elastomeric polyolefins include, for example, natural and synthetic rubbers. Synthetic rubber is any of a group of man-made elastomers which approximate one or more of the properties of natural rubber. A list of natural and synthetic rubbers along with commercial suppliers thereof is provided in 1996 Rubber World Blue Book, Rubber World Magazine, pp.377–499 (Lippincott and Peto 1996), hereby incorporated by reference. Examples of preferred synthetic rubbers include any one or a mixture of two or more of the following:

Acrylonitrile-Butadiene Copolymers (nitrile rubber), such as Goodyear's Chemigum N6B;

Acrylic Rubber such as EniChem's Europrene AR-153-EP or Zeon Chemical's HyTemp 4051 CG;

Brominated Isobutylene-Paramethylstyrene copolymers including all of the Exxpro Series which are manufactured by Exxon Chemical;

Butyl Rubber (including halogenated types, which are copolymers of isobutylene and isoprene) including all of those manufactured by Bayer Polysar or Exxon Chemical;

Chlorinated Polyethylenes Such as Dow Chemical's Tyrin Series;

Chlorosulfonated Polyethylenes such as DuPont's Hypalon Series;

Epichlorohydrin such as Zeon Chemical's Hydrin Series

Ethylene-Propylene Copolymers (EPR) such as DSM Copolymer's Keltan 3300A or 4200A or Exxon Chemical's Vistalon 404;

Ethylene-Propylene-Diene Terpolymers (EPDM) such as DSM Copolymer's Keltan 1446A, 2308 or 2506 or DuPont's Nordel 1320;

Polybutadiene such as Goodyear's Budene Series;

Polychloroprene such as DuPont's Neoprene Series;

Polyisobutylene such as Exxon Chemical's Vistanex Series;

Polyisoprene such as Goodyear's Natsyn Series;

Styrene-Butadiene Copolymers (SBR) such as Ameripol Synpol's 1009;

Styrene-Butadiene-Styrene Block Copolymers such as Shell Chemical's Kraton D-1101 or D-1102;

Styrene Ethylene-Butylene-Styrene Block Copolymers such as Shell Chemical's Kraton G-1650 or 1652; and Styrene-lsoprene-Styrene Block Copolymers such as Shell Chemical's Kraton D-1107 or D-1111.

A suitable amount of elastomeric polyolefin in the adhesive composition is readily determinable by one skilled in the art, although typically, an elastomeric polyolefin concentration of about 50 to about 99% by weight of the adhesive composition is sufficient.

The adhesive composition may also contain a compatible tackifier. Suitable tackifiers are commercially available, and optimum selection thereof can be accomplished by one of ordinary skill in the art. Representative examples of suitable, commercially-available tackifiers include hydrocarbon resins, such as, Regalrez 1018 and 1078, and REZ-D 2084 (Hercules Incorporated); Escorez-143H and 5380 (Exxon Corporation); Wingtack Plus (Goodyear); polybutenes, such as, Indopol H-100, H-300, H-1500, or H-1900 (Amoco Chemical); Parapol 700, 950, 1300, 2200, or 2500 (Exxon Chemical); phenolic resins, such as, Akron P-90 or P-133 (Akrochem); SP-1068 or SP-1077 (Schenectady Chemical) ;Durez 31671 (Occidental Chemical); and Dyphene 8318 or 8320 (Sherwin-Williams Company); and mixtures thereof. A suitable amount of tackifier is readily determinable by one skilled in the art, although typically, a tackifier concentration of about 15 to about 85% by weight of the adhesive composition is sufficient.

The adhesive composition may also include an accelerator/cure package. The rubber-based composition may be cured using any of several well-known curing systems including sulfur and sulfur-containing systems as well as zinc oxide. Suitable curing accelerators for use in the present invention includes sulfur, thiazoles, thiurams, and dithiocarbamates. For example, dipentamethlylene thiuram hexasulfide, tetraethyl thiuram disulfide, tetramethyl/ethyl thiuram monosulfide, tetramethyl thiuram disulfide, tetramethyl thiuram monosulfide, 4,4' dithiodimorpholine, 2-(morpholino-dithio)-benzothiazole, zinc dibutyl phosphorodithiate, 2-mercaptobenzo-thiazole, benzothizyl disulfide, zinc mercaptobenzothiazole, zinc dibutyl dithiocartbamate, zinc dietyl dithiocarbamate, zinc dimethyl dithiocarbamate, copper dibenzyl dithiocarbamate or tellurium diethyl dithiocarbamate, and mixtures thereof, commercially-available from Akrochem; R. T. Vanderbilt; Akzo; E. I. du Pont de Nemours and Company; Mobay; Monsanto Chemical Company; Pennwalt; and Uniroyal Chemical. The addition of a small amount of zinc oxide in the cure package (for example, about 1 to about 2% by weight of the cure package) improves the high temperature stability of the composition. A suitable amount of cure package is readily determinable by one skilled in the art, although typically, a cure package concentration of about 1.5 to about 7.0% by weight of the adhesive composition is sufficient.

The composition may further include a minor portion of carbon black and/or other conventional fillers or desiccants such as calcium oxide (lime).

The adhesive composition can be prepared using known techniques and apparatus. In a preferred embodiment, the adhesive composition is partially cured for strength. The composition, however, should not be overly cured such that it lacks solubility in the organic solvent or forms a solution with the organic solvent having a viscosity so high that it cannot effectively infiltrate the polar layer.

The organic solvent should be selected to achieve the desired dry time. More specifically, since the primer is typically dried before laminating the polar and non-polar adhesive layers, a short dry time is preferred to minimize process time and maximize productivity. The dry time should not be so quick, however, that the solvent essentially flashes off. The dry time should be long enough to achieve adequate spreading and leveling of the solution. Accordingly, a dry time of a 0.025 mm layer of the printer at 23° C. with forced air convection of 60 m$^3$/min is preferably about 10 seconds to about 5 minutes, more preferably about 20 seconds to about 3 minutes, and even more preferably about 40 seconds to about 2 minutes.

The organic solvent preferably comprises a non-polar solvent. Suitable non-polar solvents include aliphatic hydrocarbons, aromatic hydrocarbons, and/or mixtures thereof.

Suitable aliphatic solvents will be apparent to one skilled in the art. Preferred aliphatic hydrocarbons include $C_5$–$C_{10}$ straight-chain or branched alkanes, more preferably a $C_5$–$C_8$ alkane. Examples of suitable alkanes, include, but are not limited to, n-pentane, neopentane, n-hexane, n-heptane, n-octane, and 2-ethylhexane. An even more preferred aliphatic organic solvent is heptane.

Like aliphatic solvents, suitable aromatic solvents will be apparent to one skilled in the art. Preferred aromatic solvents include $C_6$–$C_{14}$ aryl-based compounds such as, toluene, xylene, and benzene, which may be substituted with, for example, alkyl, alkenyl, or alkynyl groups. A more preferred aromatic is a $C_6$–$C_8$ aryl-based compound such as toluene.

Preferably, the solvent comprises a mixture of aliphatic and aromatic hydrocarbon solvents. As those skilled in the art will appreciate, aliphatic and aromatic solvents may be blended to form solvent systems that will exhibit desired solvation for a variety of adhesive compositions and also evaporate within a desired dry time. In the most preferred embodiment, the organic solvent comprises about a 50/50 mixture of toluene/heptane.

The organic solvent and adhesive composition as described are mixed under conditions known in the art to produce the primer.

In a more preferred embodiment, the primer comprises: (a) a halogenated isobutylene-paramethylstyrene copolymer, most preferably brominated isobutylene-paramethylstyrene; (b) a thermoplastic rubber, most preferably styrene-ethylene/butylene-styrene block copolymer; (c) a known endblock resin for the thermoplastic rubber, such as, for example, cumarone indene; (d) a tackifier as described above; (e) an accelerator/cure package as described above; and (f) a solvent as described above. Such a composition is disclosed in U.S Pat. No. 5,234,987 issued to Hubbard et al. which is incorporated by reference herein.

In a highly preferred embodiment, the primer of the present invention varies slightly from that disclosed in Hubbard et al to the extent that it is more dilute. More specifically, the concentration of the organic solvent in Hubbard et al. ranges from about 60 to about 80 wt %, while the concentration of the adhesive composition in the present invention is preferably about 75 to about 97 wt. %, more preferably about 80 to about 95 wt. %, and even more preferably about 85 to about 92 wt. %.

An example of a commercially-available printer is 15% HSSP-1 (ADCO Division of Astor Corporation (Michigan Center, Mich.), an AlliedSignal Company).

In another embodiment of the tape, a polyester film is used in addition to a primer to facilitate bonding between the non-polar and polar adhesive layers. Industrial polyester films are known and a variety of one and two-sided pre-treated adhesive films are commercially available. Representative examples of commercially-available polyester films include Melinex 453, 454, 561, 725, 324, 331, and 339 (ICI Films).

Referring back to FIG. 1, it is apparent that the primer layer 12 serves to bond the non-polar adhesive layer 11 to the polar adhesive layer 13. Suitable non-polar adhesives are well known in the art and include, for example, elastomeric polyolefin-based compositions exhibiting adhesive properties. Preferably, the non-polar adhesive comprises a cured, non-solvated, rubber-based adhesive compositions derived from natural or synthetic rubbers as described above with respect to the primer. In a highly preferred embodiment, the non-polar adhesive composition comprises an EPDM-based composition.

An example of a highly preferred EPDM-based composition is disclosed in U.S. Pat. No. 5,242,727 issued to Briddell et al, herein incorporated by reference. This EPDM-based composition comprises a blend of (a) ethylene-propylene-diene terpolymer, (b) a halogenated butyl rubber or a halogenated copolymer of a p-methylstyrene and isobutylene, and (c) polyisobutylene.

Representative examples of commercially-available ethylene-propylenediene terpolymer include Vistalon 2200, 2504, 5600, and 6505 (Exxon Chemical); Royalene 501, 502, 505, 512 and 521 (Uniroyal); Trilene 65 and 67, low molecular weight terpolymers (Uniroyal); and EpSyn 2506, 40A, and 4506 (Copolymer). Examples of commercially-available halogenated butyl rubber include Bromobutyl 2030 and X-2 (Polysar); Chlorobutyl 1240 and 1255 (Polysar); Bromobutyl 2222 and 2244 (Exxon Chemical); and Chlorobutyl HT-1065, HT-1066 and HT-1068 (Exxon Chemical). Commercially-available examples of the halogenated copolymer of p-methylstyrene and isobutylene include Bromo XP-50 (Exxon Chemical). Examples of commercially-available polyisobutylene include Vistanex L-80, L-100, L-120, and L-140 (Exxon Chemical); a low molecular weight polyisobutylene such as LMMS or LMMH (Exxon Chemical); Oppanol B-50 or B-100 (BASF Corporation); and Oppanol B-10 or B-15 (BASF Corporation).

An example of a commercially-available, non-polar adhesive layer suitable for the tape of the present invention is SP-505 (ADCO).

Suitable polar adhesives having suitable adhesion strength are also known in the art. For example, a teaching of many suitable polar adhesives is provided in U.S. Pat. No. Re. 24,906 issued to Ulrich, hereby incorporated by reference. Of the various monomers having strongly polarized groups recited therein, acrylic acid-based compounds are preferred, while non-tertiary acrylic acid alkyl esters are more preferred. In a highly preferred embodiment, the adhesive comprises an acrylic-based composition of at least one non-tertiary acrylic acid alkyl ester and optionally other polar-moiety containing monomers, cross-linking agents, organofunctional silane compounds, or polar copolymerizable dimers as described in U.S. Pat. No. 5,354,600 issued to Fisher et al. and incorporated herein by reference.

An example of a commercially-available, polar adhesive layer suitable for the tape of the present invention is ATC-203 (ADCO).

As shown in FIG. 1, the polar adhesive layer of the present invention may optionally include a carrier layer 14 as a substrate. Carrier layers are known in the art and are described, for instance, in Fisher et al. supra. For example, in a preferred embodiment the carrier layer comprises an acrylic-based polymeric composition, similar to that of the acrylic-based adhesive composition described above, with additional fillers to increase the volume and viscosity of the polymeric carrier.

The present invention also provides for a method of making a multi-component adhesive tape. Generally, the method involves priming the interface between the two adhesive layers and then laminating them. The priming step comprises applying a primer to the polar adhesive layer, the non-polar adhesive layer, or both layers. In a preferred embodiment, the polar adhesive layer is primed first, before lamination of the layers.

Figure 2:
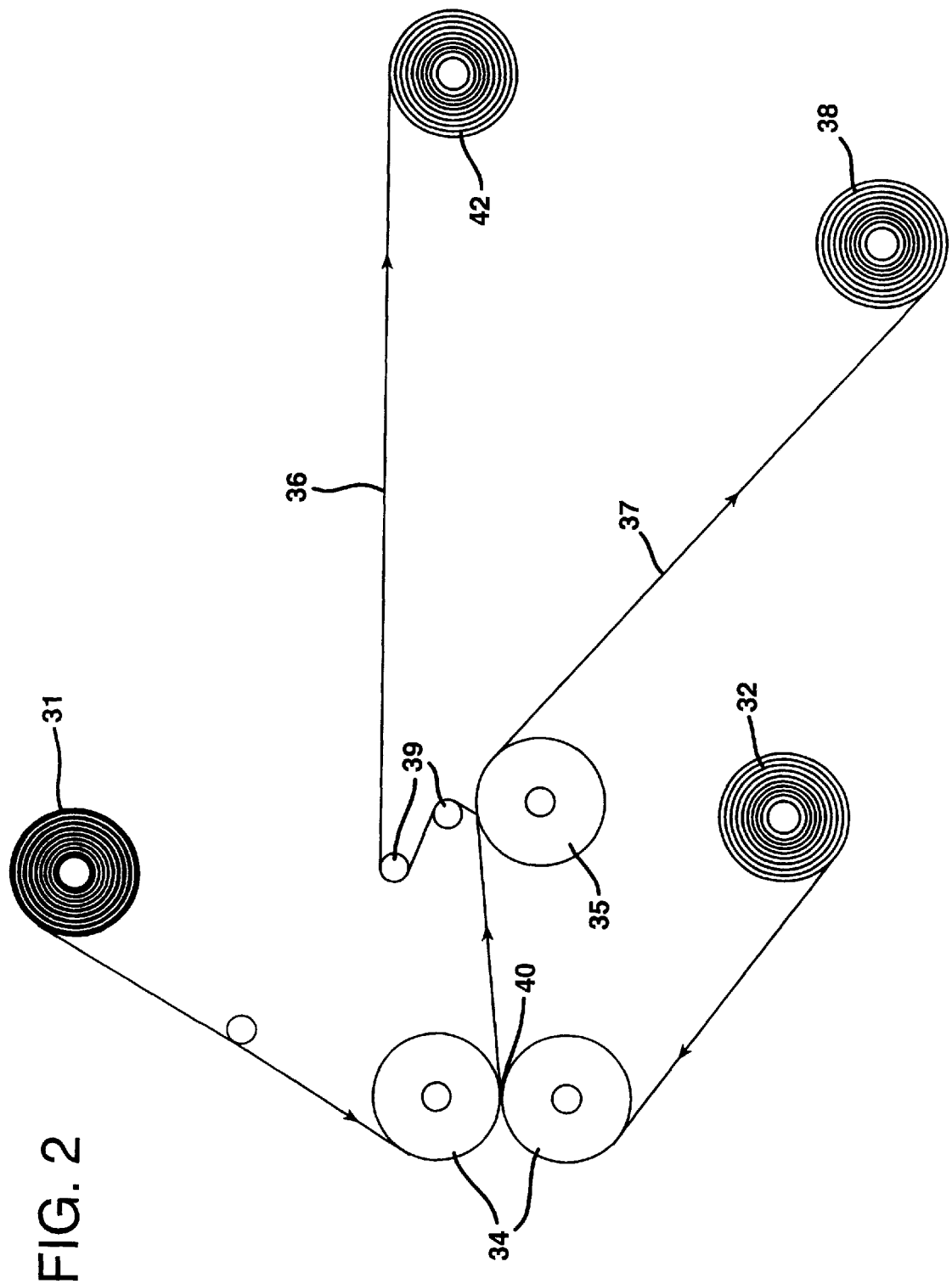
FIG. 2 shows one embodiment of the method of making the multi-component tape of the invention.

A preferred method of laminating the double-sided tape of the present invention is shown schematically in FIG. 2. As shown, a roll of non-polar adhesive tape 31 (e.g., SP-505) and a roll of primed polar adhesive tape 32 (e.g., primed ATC-203) are positioned on the top and bottom mandrels, respectively, of a mating unit. For both the polar and non-polar adhesive tapes, it may be advantageous from a handling standpoint to apply a release film on the side of each layer of adhesive tape which is not mated such that the tape can be rolled-up and unrolled with ease. The two tapes are laminated in the nip 40 formed by mating rolls 34. The mated tape is then pulled over a guide roll 35 where the direction of the mated tape is changed significantly by guide bars 39 to effect separation of the release film 36 from the mated tape 37. After separation, film 36 is wound on roll 42 for disposal or reuse. The mated tape 37 having a release film on the polar adhesion side is wound on roll 38. Since its release film is removed, the non-polar adhesive layer is exposed and adheres to the release film of the polar adhesive layer with sufficient strength to prevent the roll from unrolling.

While FIG. 2 illustrates a preferred embodiment of the invention, one skilled in the art will appreciate that many variations of the method within the scope of the claims are possible. For example, the finished roll 38 may be wound in an opposite direction, that is, with the polar adhesive side facing inward, thereby requiring that the release film of the polar adhesive layer be removed instead of the release film of the non-polar adhesive. Additionally, the adhesive layers may be laminated in a flat-surfaced press mechanism, or pressed through a die or other device known in the art for laminating.

Another aspect of the invention, as mentioned above, is a method of using the double sided tape to join a polar surface to a non-polar surface. As those skilled in the art will appreciate, the polar/non-polar adhesive layers of the tape are bonded conveniently to a polar/non-polar surface, respectively, at ambient temperature by the simple application of pressure.

This application technique offers significant advantages over prior art adhesive systems. First, it avoids the expense and danger inherent in other application methods. For example, EDPM-based weather-stripping manufacturers currently must purchase expensive heating equipment to heat the nip point between a heat activated adhesive tape and the EPDM-based weatherstripping. The application method of the present invention, however, requires no external heating or specialized equipment. Furthermore, the method of the present invention allows the user to apply the adhesive to either a polar or non-polar surface first. Such an option is unavailable for prior art adhesive systems since it requires heating the non-polar side prior to application. That is, if the polar side is applied first to a painted surface for example, subsequently heating the non-polar side with a hot air gun may not be an option as the heat could destroy the finish of the painted surface.

Figure 3:
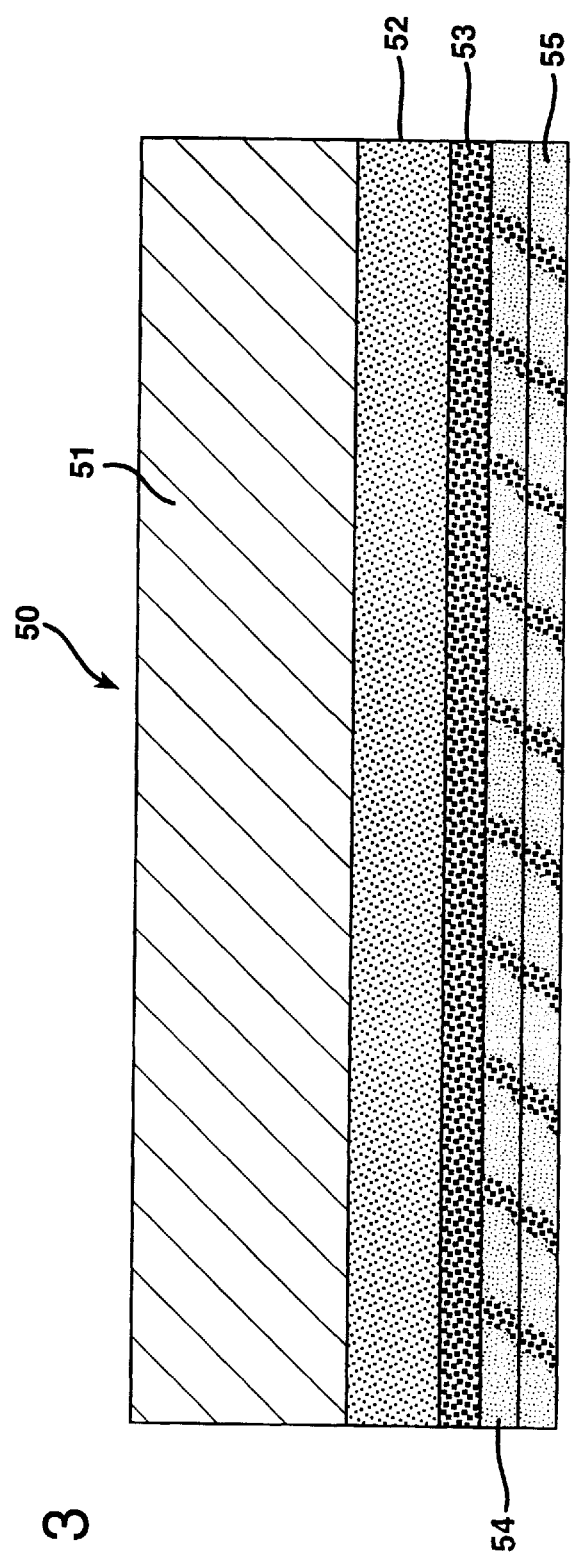
FIG. 3 shows a cross-section of a portion of one embodiment of the modified strip of EPDM of the invention.

The present invention also provides for an article adhered thereto the double-sided tape described above with either the polar or non-polar side of the tape exposed for adhesion to its respective surface. For example, one embodiment of the article of this invention is shown in FIG. 3. Preferably, the article 51 is a strip of pliable material which is bonded to the non-polar side 52 of the tape. In such a case, the polar adhesive side 55 is exposed and ready for adhesion to a polar surface such as a painted car surface. Preferably, the pliable material comprises an elastomeric composition derived from natural or synthetic rubbers as described above with respect to the solvent-based adhesive composition. More preferably, the pliable strip comprises a rubber-based material such as EPDM compositions. Examples of modified pliable strips include, but are not limited to, automotive weatherstripping, decals, gasketing materials, and window insulating kits. The pliable strip of this invention can be readily bonded to a wide range of polar surfaces or can be stored for adhesion to a polar surface at a later time. To shield the tape from contaminants, a readily-removable thin release film may be bonded to the exposed side of the tape.

EXAMPLE

This example illustrates the strength of the multi-component adhesive tape of the present invention.

Three multi-component adhesive tapes A, B, and C were prepared in accordance with the present invention and tested using a peel adhesion test as defined by GM9797P test method. For comparison, tape D was prepared without the primer layer and also tested using a peel adhesion test. The results of these tests are shown in Table I. Also for comparative purposes, the General Motors Standard GM 3802M Type VII is indicated in Table I.

In addition to peel strength, a creep test was performed on Tape A as defined by GM9758P test method, the results of which are listed in Table II.

The polar layer of Tape A was formed by applying ATC-101 brand carrier/prepolymer mixture (commercially available from ADCO), to one side of an ATC-203 brand cured acrylic adhesive component (commercially available from ADCO). The carrier component was then cured on the acrylic adhesive component via UV-B lamp radiation. This polar layer, comprised of the carrier component and the adhesive component, was then primed on the carrier side with 15% HSSP-1 brand adhesive solution (commercially available from ADCO). The priming step was carried out by feeding a roll of about 100 ft of the cured polar layer through an applicator mechanism wherein the primer was rolled onto the polar carrier side of the polar layer. The primer-coated polar layer was carried past a series of blowers to affect proper evaporation of the primer solvent and then wound onto another roll. The primed polar layer was then laminated to an SP-505 brand non-polar adhesive layer (commercially available from ADCO) using an apparatus schematically depicted in FIG. 2.

In a manner similar to the preparation of Tape A, Tape B was formed by priming an ATC-400 brand polar layer (commercially available from ADCO), with 15% HSSP-1 brand adhesive solution and then mating the polar layer with the SP-505 brand non-polar adhesive.

Tape C was formed by overlaying a Melinex brand polyester film on an ATC-209 brand polar adhesive (commercially available from ADCO), priming the polyester film with 15% HSSP-1 brand adhesive solution, and then mating the primed polyester film to an SP-505 brand non-polar adhesive layer. Tape C was then cured at 240° F. before testing.

For comparative purposes, Tape D was formed by laminating an ATC-209 brand polar adhesive layer to an SP-505 non-polar adhesive layer with only a Melinex film therebetween.

The peel adhesion tests were conducted by first adhering the non-polar adhesive layer of the tape to a section of weatherstripping and subsequently adhering the polar adhesive layer to a painted panel. The samples were then aged under various conditions, as indicated in Table I. The samples were clamped to a tensile testing machine and pulled at room temperature at a 90 degree angle and a rate of 12 in/min. The value of the force required to induce adhesive failure, cohesive failure, shallow cohesive failure, or splitting of an adhesive was recorded in pounds per one-inch of width of the sample. As used herein, the term "adhesive failure" refers generally to the breaking of a bond between an adhesive layer and a substrate, the term "cohesive failure" refers generally to the physical rupture of one of the adhesive layers of a multi-component tape, the term "shallow cohesive failure" refers generally to only a slight degree of physical rupture of one of the adhesive layers of a multi-component tape, and the term "adhesive splitting" refers generally to the physical separation of one adhesive component from another adhesive component.

As indicated in Table 1, the sample tapes tend to exhibit adhesive failures when aged at room temperature but tend to exhibit cohesive failures when aged at elevated temperatures for a certain period, i.e., 7 days at 158° F. Presumably, this trend is evidenced not as a result of diminished cohesive strength, but rather as a result of improved adhesive strength through improved wetting. Moreover, it is noted that Tapes A, B, and C do not exhibit adhesive splitting under any of the aging conditions indicated in Table I, whereas Tape D exhibits adhesive splitting when aged at room temperature for 24 hours. Additionally, the peel strength of Tapes A and B exceed current automotive standards as set forth in General Motors Engineering Standard GM 3802M Type VII.

The creep test was performed on Tape A by attaching the non-polar side of one square inch (1"×1") of the adhesive tape to a strip of EPDM-based weatherstripping and the polar side to a painted panel. The test sample was then secured in a vertical position and a weight was attached to the sample. The creep was recorded as the distance of slippage of the adhesive over a 96 hour period at 158° F. The results for tests using 250, 300, and 500 gram weights are listed in Table II. Tape A exceeded the GM automotive maximum movement standards of 1.8 mm as set forth in GM 3802M VII.

TABLE I

| | Peel Adhesion Performance (lbs./in. of Sample Width) | | | | Engineering Standard GM3802M Type VII Minimum Requirement |
|---|---|---|---|---|---|
| | Tape Samples | | | | |
| Aging Conditions | A | B | C | D | |
| 24 h, r.t. | 8.0[1] | 9.0[1] | 15.4[1] | 11.8[1,4] | |
| 3 d, r.t. | 10.2[1] | 11.6[1] | 11.6[1] | 7.4[1] | 6.7 |
| 7 d, 158° F. | 30.0[2] | 26.0[2] | 13.0[1,2] | 8.0[2] | 15.7 |
| 7 d, 180° F. | 23.8[3] | 25.8[3] | | | |
| 3 d, humidity | 11.4[1] | | | | 9 |
| 7 d, humidity | 13.0[1] | | | | |

[1]Adhesive Failure
[2]Cohesive Failure
[3]Shallow Cohesive Failure
[4]Adhesive Split

TABLE II

Creep Performance of Tape A

| Weight Attached (g) | Movement (mm) |
|---|---|
| 250 | 0.0 |
| 300 | 0.0 |
| 500 | 0.0 |

What is claimed is:

1. A multi-component pressure sensitive adhesive tape for adhering polar surfaces to non-polar surfaces comprising:
    (a) a non-polar adhesive layer for bonding to a non-polar surface, said non-polar adhesive layer comprising an EPDM-based composition; and
    (b) a polar adhesive layer bonded to said non-polar adhesive layer for bonding to a polar surface.

2. The multi-component adhesive tape of claim 1 wherein said tape has a peel strength of at least about 4 pli after aging for 24 h at r.t.

3. The multi-component adhesive tape of claim 2 wherein said tape has a peel strength of at least about 7 pli after aging for 24 h at r.t.

4. The multi-component adhesive tape of claim 1 wherein said tape supports a static load of at least about 0.2 lb/in$^2$ at 70° C.

5. The multi-component adhesive tape of claim 4 wherein said tape supports a static load of at least about 0.7 lb/in$^2$ at 70° C.

6. The multi-component adhesive tape of claim 1, comprising a primer layer between said polar adhesive layer and said non-polar EPDM-based composition adhesive layer, said primer layer partially infiltrating said polar layer.

7. The multi-component adhesive tape of claim 6, wherein said primer layer comprises a partially cured, rubber-based adhesive.

8. The multi-component adhesive tape of claim 1 wherein said polar adhesive layer comprises at least one non-tertiary acrylic acid ester monomer.

9. The multi-component adhesive tape of claim 8 wherein said polar adhesive layer comprises (i) at least one non-tertiary acrylic acid ester monomer; (ii) polar-moiety containing monomers; (iii) a cross-linking agent; (iv) an organofunctional silane compound; and (v) a polar copolymerizable dimer.

10. A method of making the multi-component adhesive tape having polar and non-polar adhesive layers on opposite sides thereof of claim 1, said method comprising:

(a) priming a side of said polar adhesive layer with a solvent-based adhesive composition; and (b) mating said polar and non-polar EPDM-based composition adhesive layers with the primed side therebetween.

11. The method of claim 10, wherein said solvent-based adhesive comprises a rubber-based adhesive solution.

12. The method of claim 11, wherein said rubber-based adhesive solution comprises: (i) a halogenated isobutylene-paramethylstyrene copolymer; (ii) a thermoplastic rubber; (iii) an endblock resin for said thermoplastic rubber; (iv) a tackifier; (v) an accelerator/cure package; and (vi) a solvent.

13. A modified article suitable for adhesion to either a polar or non-polar surface of a second article, said modified article comprising:

(a) a first article; and (b) a double-sided pressure sensitive tape comprising:
   i. a non-polar EPDM-based composition adhesive layer; and
   ii. a polar adhesive bonded to said non-polar EPDM-based composition adhesive layer; wherein either said polar or non-polar layer is adhered to the first article leaving the non-adhered layer available for bonding to the respective polar or non-polar surface of said second article.

14. The modified article of claim 13, wherein said article is a strip of EPDM-based weatherstripping and wherein the non-polar layer is applied to said EPDM-based weatherstripping leaving said polar layer available for application to a polar surface.

15. A method of joining polar surfaces to non-polar surfaces using the multicomponent adhesive of claim 1 comprising a non-polar EPDM-based composition adhesive layer for bonding to a non-polar surface and a polar adhesive layer bonded to said non-polar EPDM-based composition adhesive layer for bonding to a polar surface, said method comprising applying either the polar or non-polar EPDM-based composition adhesive layer to a polar or non-polar surface, respectively.

16. The method of claim 15, further comprising:

applying the remaining non-applied adhesive layer to its respective surface.

17. The method of claim 16, wherein said polar surface is a painted surface, and wherein said non-polar surface is the surface of EPDM-based weatherstripping.

* * * * *

UNITED STATES PATENT AND TRADEMARK OFFICE
CERTIFICATE OF CORRECTION

PATENT NO : 6,106,941
DATED : August 22, 2000
INVENTOR(S) : Fisher et al.

It is certified that error appears in the above-identified patent and that said Letters Patent are hereby corrected as shown below:

Column 12, line 9, "non-polar layer" should be - - non-polar EDPM-based composition layer - -.

Signed and Sealed this

Seventeenth Day of April, 2001

*Attest:*

NICHOLAS P. GODICI

*Attesting Officer*     *Acting Director of the United States Patent and Trademark Office*